United States Patent [19]

May

[11] Patent Number: 4,839,507

[45] Date of Patent: Jun. 13, 1989

[54] METHOD AND ARRANGEMENT FOR VALIDATING COUPONS

[75] Inventor: Lance May, 44 Victoria Street, North Sydney, New South Wales, Australia, 2060

[73] Assignee: Lance May, Kirribilli, Australia

[21] Appl. No.: 169,576

[22] Filed: Mar. 17, 1988

[30] Foreign Application Priority Data

Nov. 6, 1987 [AU] Australia ................................ PI5296

[51] Int. Cl.[4] ................................................ G06F 7/08

[52] U.S. Cl. ..................................... 235/381; 235/487

[58] Field of Search ................................ 235/381, 487

[56] References Cited

U.S. PATENT DOCUMENTS 4,518,852 5/1985 Stockburger ....................... 235/381

*Primary Examiner*—Harold I. Pitts

*Attorney, Agent, or Firm*—Birch, Stewart, Kolasch & Birch

[57] ABSTRACT

A method and machine for verifying or validating coupons wherein the method comprises passing at least two juxtaposed coupons, each of which has a bar code printed or formed thereon, through or relative to a bar code reader, such that the juxtaposed coupons if accepted by said bar code reader cause matter to be dispensed from a holding and dispensing device. In the machine for verifying or validating coupons, a bar code reader adjacent the inlet, a holding and dispensing device and a programmed processor are also provided within the housing. The arrangement is such that on at least two juxtaposed coupons being passed into and through said bar code reader substantially simultaneously, and being accepted thereby, a predetermined or desired amount of matter is caused to be dispensed from said holding and dispensing device.

13 Claims, 3 Drawing Sheets

METHOD AND ARRANGEMENT FOR VALIDATING COUPONS

BACKGROUND OF THE PRESENT INVENTION

This invention relates to a method and arrangement of machinery for use in the validating or verification of coupons.

In this day and age it is very popular for manufacturers and retail outlets to distribute individual or books of coupons which carry a product identity and an amount which will be credited to the customer if and when the particular product is purchased. For example, newspapers or magazines may carry a number of coupons. Such coupons would usually be cut out by a purchaser and then taken to a local store where the product identified on the coupon would be purchased. On paying for the product, the purchaser will receive a credit for the amount stated on the coupon, in relation to that article purchased. This has been found to be a very time consuming and expensive system to operate, in that it requires that staff in retail outlets and the like must collate coupons and keep records thereof so that the retailer can in due course return the coupons to the manufacturer to obtain an appropriate refund against the credits given to customers.

This procedure has been found to be labor-intensive and time consuming. As such there is often retail resistance to involvement in such schemes. At the same time, many manufacturers are anxious to have such schemes in operation, as an incentive to have their particular products purchased. In other words, if the purchasing public are aware that a refund is likely to be given following purchase of a particular product, this is an incentive to purchase that particular product.

The present invention sets out to provide a method and arrangement whereby the problems outlined above are hopefully overcome or at least minimized, while still allowing a coupon redemption scheme to successfully operate. In particular, the present invention sets out to eliminate or at least minimize the involvement of retailers.

BRIEF SUMMARY OF ASPECTS OF THE PRESENT INVENTION

According to one aspect of this invention, there is provided a method of coupon verification and validation, wherein at least two juxtaposed coupons each having a bar code printed or formed thereon, are passed substantially simultaneously through or relative to bar code reader means, such that said juxtaposed coupons, if accepted by said bar code reader means, cause matter to be dispensed from a holding and dispensing mechanism.

According to a further aspect of this invention, there is provided a machine for verifying coupongs, wherein said coupons each carry bar code markings; comprising a housing having an inlet for said coupons; bar code reader means being provided at or adjacent said inlet and within said housing; holding and dispensing means and a programmed processor being provided within said housing; the arrangement being such that on at least two coupons being passed substantially simultaneously, into and through said bar code reader means, and being accepted thereby, a predetermined or desired amount of matter will be dispensed from said holding and dispensing means.

According to a further aspect of this invention there is provided a coupon for use with a machine adapted to verify or validate at least two coupons, passed substantially simultaneously into said machine relative to bar code reader means; advertising matter or indicia appearing on a first face of said coupon; a second face of said coupon being provided with a bar code marking; a spacing or area being provided on said second face and adjacent said bar code marking, such as to permit a further coupon with a bar code marking thereon to be placed over or in juxtaposition with said spacing or area, such that said bar code markings are positioned in juxtaposition one with the other to allow them to be passed substantially simultaneously into said housing relative to said bar code reader means.

Throughout the specification reference is made to the term "coupon" as applying to a coupon carrying or incorporating a bar code marking. The term "coupon" is defined and used throughout the specification as meaning a coupon carrying a bar code such as might be delivered by mail, cut from a magazine or newspaper, or provided by a manufacturer and also includes a part of a package or container of product, as contains a bar code, and which may be removed, pulled or cut from such a container. The present invention provides that at least two such coupons carrying bar codes are used, and such coupons will carry product and/or identification codes, such as to allow for activation of the machine of the present invention.

BRIEF DESCRIPTION OF THE ACCOMPANYING DRAWINGS

This invention will now be described by way of example only and with reference to the accompanying drawings which are given by way of illustration only, and thus are not limitative of the present invention, and wherein.

DETAILED DESCRIPTION AND PREFERRED EMBODIMENTS OF THE INVENTION

Figure 1:
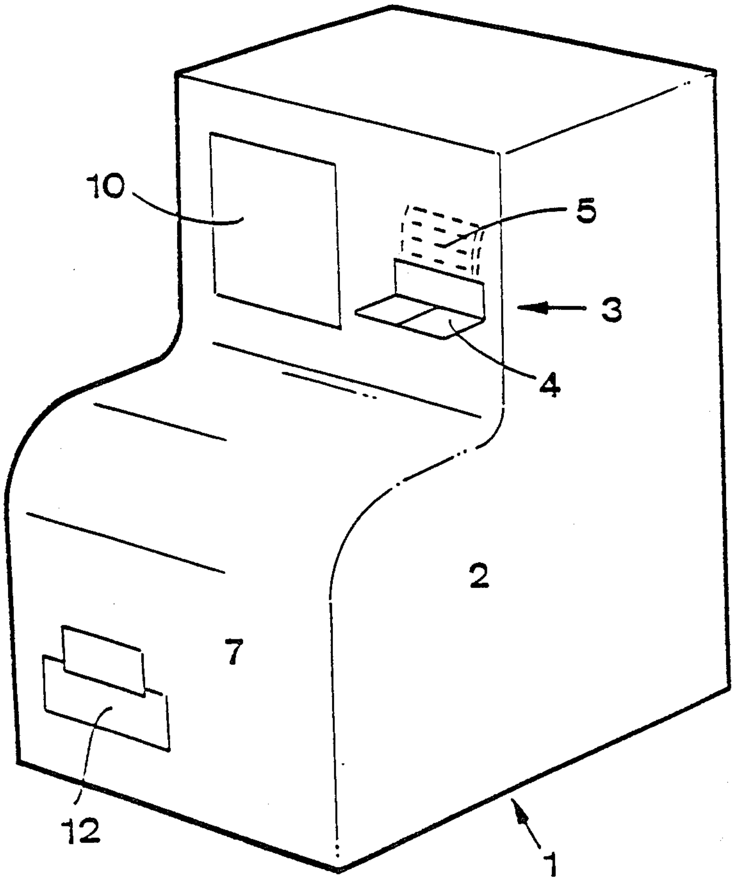
FIG. 1 is a general arrangement of a machine according to one form of the present invention.
Figure 2:
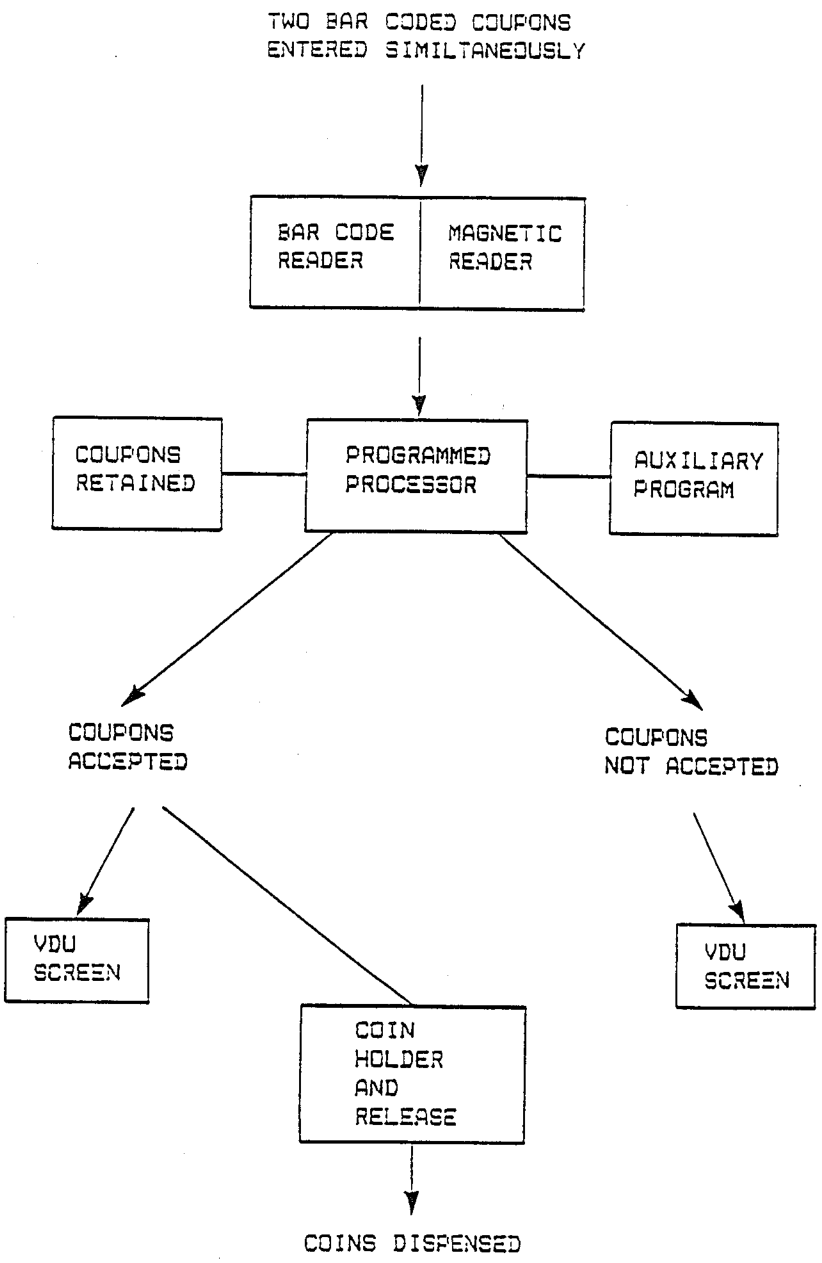
FIG. 2 is a schematic flow diagram of the components and operation according to one form of the present invention.

As referred to hereinbefore, the present invention relates to a method and means for validating and verifying coupons. In particular, the invention relates to a method and means for validating coupons such as may be distributed on contained in newspapers, or incorporated into, or forming a part of containers, packages and the like, to enable purchasers and members of the public to obtain refunds on articles of merchandise advertised by manufacturers. For example, many manufacturers desire to encourage members of the public to purchase their products. Accordingly, they prepare coupons which are either delivered to residences, or alternatively are contained in newspapers, periodicals, magazines and the like. That is, however, by way of example. Such coupons are often associated with advertisements for a particular product and the advertisements indicate that if a particular product is purchased, there will be a refund of a certain amount of money. For example, a number of cents (for example, only thirty cents) may be refunded. Up until this time, it has been common for such coupons to be taken to retail outlets, and for the product to be purchased, such that when the product is presented for payment, the coupon is also presented and a credit is provided for the amount concerned. As indicated above, this involves the retailer in some amount of trouble and time in so far as both money and time are concerned.

The present invention sets out to provide means and method, whereby such problems are overcome or minimized.

Thus, in the one preferred form of the invention, coupons are delivered or supplied to purchasers such as through the mail, by newspapers or by home delivery. Such coupons are individually printed coupons, sheets of coupons or alternatively coupons which are incorporated into pages of papers, magazines and the like. The coupons include, or have marked thereon, appropriate bar codes. The advertisement associated with the coupon indicates that the coupon will be redeemable for an appropriate amount of cash or goods, if a corresponding or complementary bar code is obtained from the goods concerned. For example, if the advertisement relates to a packet of potato crisps, the coupon will relate to that product and will have a bar code marked on it. At the same time, the matter or advertisement associated with the coupon in the newspaper, hand-out, magazine or the like, will indicate that a complementary or corresponding coupon will be found on a packet of the goods concerned, for example potato crisps. Thus, on the purchaser buying a packet of potato crisps, it will be found that the package thereof includes or incorporates a coupon, or carries on it a bar code which can be removed or cut from the package. This will then form a second coupon carrying a bar code.

It should be appreciated that the reference to potato crisps is by way of example only and that the reference can be to any particular package or container carrying goods or products.

Thus, when the bar code is removed or cut from the package, the purchaser will have the bar code from the coupon and the bar code from the package, the bar code from the package preferably being a product identifying bar code.

Both the advertisement and the package will preferably carry directions to the effect that once both coupons have been obtained, they are capable of being redeemed for an amount of money or the like, for example, thirty cents.

Thus, the invention of the present application provides that the two coupons are then taken to an appropriate machine or apparatus, which is adapted to verify the bar codes and thereafter to cause appropriate means to dispense to a customer an appropriate amount of cash, discs or the like. It is however envisaged, that while it is preferred to dispense cash, such as in the form of coins, discs, products or the like could also be dispensed.

The machine of the present invention includes an outer housing 2 which incorporates an inlet means, a slot for example, through which appropriate coupons are inserted. Inwardly of, adjacent to, and associated with the inlet means 3, is a bar code reading means adapted such that, at least two coupons, each having a bar code printed thereon, must pass through the inlet 3 and relative to the bar code reader before the bar code reader will actuate or cause to be actuating appropriate mechanisms (as will hereinafter be described) to result, for example, in coins being dispensed from the housing.

The bar code reader is, in one form of the invention, so formed as to be adapted to read multiple bar codes passed therethrough or relative thereto. The bar code reader can be a reader adapted to process and read a plurality of bar codes at one time, or substantially simultaneously, or alternatively can be formed from a plurality of juxtaposed bar code readers, each being adapted and programmed to read a specific bar code substantially simultaneously. Any other appropriate bar code reading means can also be used.

Within or in association with the housing 2, and adjacent the inlet means 3, are preferably provided means such as a plate slide 4 which is adapted to house and locate the coupons and to pass the coupons substantially simultaneously, side by side or end on end, into the housing through the inlet 3. The slide 4 preferably has a base which slides or moves on rollers, or slide rails, to allow the juxtaposed coupons to pass into the housing and relative to the bar code reader means and if present, security reader means. In one form of the invention, means can be provided within the housing and in association with the slide 4, so that once the coupons have been read and accepted by at least the bar code reader means, the coupons will be released from the inlet slide 4 to prevent further use. For example, the slide plate 4 may move on slide members which are capable of pivoting about a horizontal axis. Thus, when the slide plate 4 is pushed fully into the housing, it will pivot about a horizontal axis to deposit the used coupons into an appropriate receptacle within the housing. It is envisaged that in at least one form of the invention such a pivotal mounting can be controlled from the programmed processor, so that once the programmed processor acknowledges that the coupons have been read and accepted, it will cause a release mechanism to be actuated thereby causing and allowing the slide plate 4 to pivot, in the manner referred to, so as to place the coupons into the appropriate container or receptacle. This is, however, by way of example only and other means can be used if desired for retaining coupons within the housing following use and acceptance by bar code reader means.

The machine of the present invention further includes an appropriate programmed processor such as a computer, mini computer, micro-processor, or similar processor or computer. This is programmed in an appropriate manner, so as to allow for the functions of the machine to be carried out. This will be further described hereinafter.

If the coupons are not accepted by the bar code reader (for example, if they are incorrect coupons), the coupons will not be retained within the housing and will be returned to the operator. In a preferred form of the invention, the exterior of the housing 2 adjacent the inlet 3 carries appropriate directions, and instructions (such as at 5), as to the particular and required location and positioning of the coupons. If for example, the coupons are inserted through the inlet 3 relative to the bar code reader, and the bar code reader indicates to the programmed processor that they are incorrectly positioned, the processor will send a message to a screen 10, such as a VDU screen, on the front 7 of the housing 2, which will in turn show a message to the user to the effect that the coupons have been incorrectly positioned or alternatively to the effect that incorrect coupons are being used.

It is preferred that the processor of the present invention, and as located within the housing 2 and connected to the various components, is permanently programmed as to the basic operations of the machinery.

Given, however, that the invention sets out to provide a means for validating coupons relating to specific products, the nature of the products and the amounts of refunds may well vary from time to time (for example, every week or two weeks or months). Thus, an auxiliary program in the form of a cartridge or floppy disk may be entered into or associated with the processor, for predetermined periods. Such an auxiliary program will hold, for the period concerned, data and information relating to the refunds available and the products concerned, and for which the various coupons will be inserted into the machine. For example, if over a one week period there are five or six different items of product, in respect of which the coupons are offered, the auxiliary program will have that information entered onto it and the appropriate cartridge or floppy disk will be mounted into the programmed processor. The auxiliary disk can be replaced or varied (i.e. the information thereon can be varied or altered) as desired by a user or operator.

In use therefore, where at least two juxtaposed coupons, each having a bar code thereon, are passed through and accepted by the bar code reader, this will send a message to the programmed processor, which in turn will activate appropriate means associated with the inlet so that the coupons are retained within a coupon hopper. At the same time, if the coupons are accepted, the processor will forward a further signal to the screen 10 or VDU associated with the housing 2, and using the information or data contained on the auxiliary program, will extract product information from one or both of the bar codes of the coupons, so that on the screen 10 or the video display unit, information relating to the product in respect of which the user is seeking a refund, will appear. Simultaneous therewith, the programmed processor will forward a signal to a coin holder and release or dispensing mechanism, whereby the predetermined number or amount of coins will be released through a coin outlet 12, at a position exterior the housing, for collection by the user.

By way of example, a purchaser or user may cut out from a newspaper or magazine (or may have delivered to a household) a coupon relating to a packet of food stuffs. The matter associated therewith might indicate that on production of the coupon(s) a refund of some thirty cents is available. At the same time, the matter will indicate that a further coupon carrying a product bar code will have to be removed from a packet of the food-stuffs concerned. Thus, the purchaser will purchase a packet or container of that food-stuff and will remove or cut a portion off the packet, said portion including the bar code. The two coupons (being the basic coupon and the additional matter removed from or cut from the package or container) are then passed into the machine 1 through the inlet 3, relative to the bar code reader which in turn (if the coupons are accepted by the bar code reader) will activate the processor to retain the coupons, place information on the screen 10, relating to the product concerned, and at the same time activate the coin holding, dispensing and release mechanism so that substantially simultaneously with the appearance of information on the screen 10, the predetermined number or value of coins will pass out of the machine through a coin outlet or a dispensing slot 12, or the like.

If the bar codes are not accepted by the bar code reader (for example, they may be turned the wrong way or alternatively may be incorrect coupons), this will be transmitted to the programmed processor, and there will be no activation of the retaining means. In other words, the user will be free to remove the coupons. The coupons will not, therefore, be retained in the housing and will not find their way into the hopper. At the same time, the programmed processor will transmit to the screen or VDU 10 information relating to the activities. In other words, the processor will transmit information such as "incorrect coupons entered" or "coupons entered incorrect way".

Referring specifically to FIG. 1 of the accompanying drawings, the housing will be seen to be in the form of a dispensing machine 1, having a general body portion 2 with an inlet 3 into which the coupons can be inserted, and an outlet 12 through which predetermined numbers or amounts of coin can be dispensed. Preferably, the front 7 of the machine 1 is also provided with an appropriate screen or video display unit 10 so that information relative to the activities of the user or relative to products in respect of which a refund is being sought, can be displayed.

It should be appreciated that while the invention has been described by way of example to using two such coupons, each containing a bar code, this is by way of example only. More than two such coupons can be used if desired.

In one preferred form of the invention, security means of an additional nature may be provided in addition to bar code reader means. Thus, one or both of the coupons can be provided with some additional form of security information or insert, such as for example magnetic ink, magnetic tape or the like. Such information is preferably incorporated into the coupons adjacent to the bar code. If desired, such information can be inserted into only one coupon.

In such a form of the invention, the machine 1 is also provided with appropriate security reading means, for example a magnetic reader. The bar code reader means and security reader means may, if desired, be combined into one component or alternatively can be separate adjacent and juxtaposed components.

In one preferred form of the invention, at least one (and if desired both) coupons are provided with some security insert, such as for example magnetic ink. In such a case, a magnetic reader can be provided, so that the two coupons will only be accepted through the bar code reader and security reader, if the magnetic reader correctly reads the magnetic ink. In alternative forms of the invention, the security reader reads one or more appropriate security markings. If there is no appropriate reading, then a message will be forwarded to the programmed processor, which in turn will forward a message to the screen or video display unit 10, which will indicate that the coupons are unacceptable. If the coupons are passed through both the bar code reader and the security reader (i.e. magnetic reader), the process will proceed as outlined above.

Figure 3:
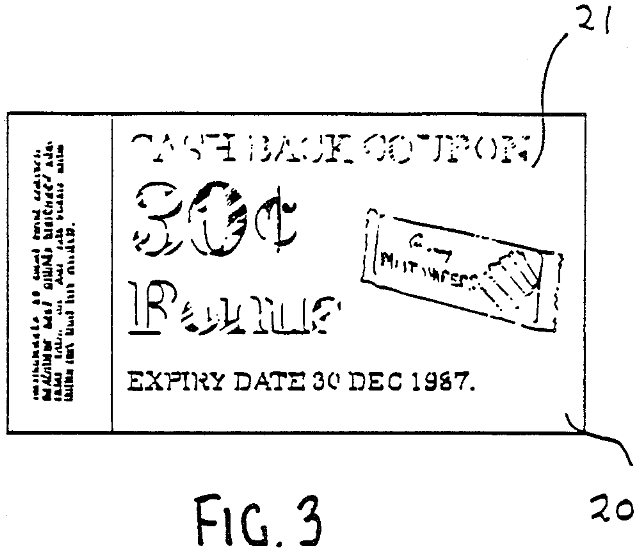
FIG. 3 is a view of a front face of a coupon according to one form of the present invention.
Figure 4:
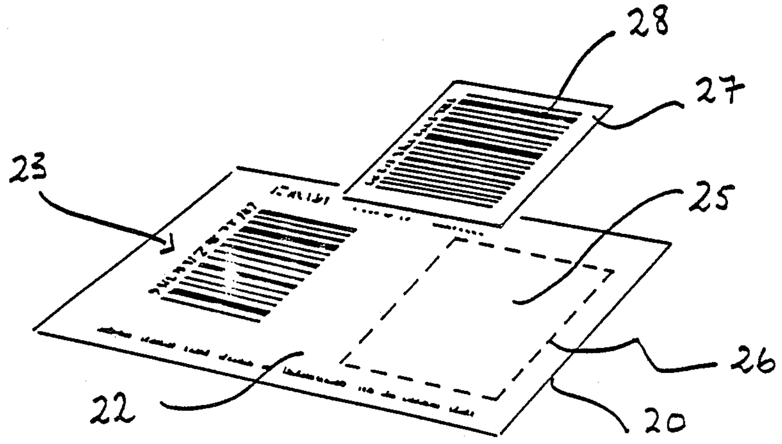
FIG. 4 is a view of a reverse face of a coupon in juxtaposition with another coupon according to one aspect of the present invention.

Referring now to FIGS. 3 and 4 of the accompanying drawings, these show examples of a coupon 20 that can be used in association with the present invention. FIG. 3 shows the top or upper side 21 of a coupon 20, such as might be found in a magazine, or in a sheet of coupons that might be delivered to households and the like. The top face 21 of the coupon 20 carries appropriate advertising matter and information, for example the period furing which the coupon is valid. It also preferably includes an indication as to the product(s) to which the coupon relates.

Referring to FIG. 4 of the accompanying drawings, this shows the reverse or underside 22 of a coupon 20 and it will be seen that in the preferred form of the invention, at least one side portion of the reverse side or face 22 is provided with a bar code 23. The reverse face 22 is also provided with an area or space 25, outlined by a dotted line or border 26.

In use and when it is desired to present coupons to a machine according to one form of the present invention, a coupon 20 such as that shown in FIG. 3 of the drawings is taken and placed upper face 21 down with the bar code 23 facing upwardly. In addition, a further coupon 27 incorporating a bar code 28 and relating to the same product, is taken and placed over or adjacent the area 25 at one side of the reverse or rear face 22 of the coupon 20 so that the two bar codes 23, 28 are substantially juxtaposed or side by side. Preferably the bar codes 23, 28 both face upwardly.

In a preferred form of the invention, the further coupon 27 is provided by removing it such as by tearing or cutting, from a packet, such as, for example, a packet of the product to which the first coupon 20 relates. For example, if the coupon 20 shown in FIG. 3 of the drawings relates to a particular brand of soft drink, this will be shown on the upper face 21 of the coupon 20. Further, the label or container of the soft drink when purchased will carry an additional coupon 27 incorporating a bar code 28, which can be removed or cut from the label or container. This can then be placed in juxtaposition with and preferably substantially side by side with the bar code 23 on the underside 22 of the coupon 20 (as shown in FIG. 4 of the accompanying drawings). In a further form of the invention, the upper face 21 of the coupon could, for example, show a particular brand of toothpaste, the second coupon 27 incorporating a bar code can be cut from the package containing the toothpaste. These are however, by way of example only.

In one preferred form of the invention, the two coupons 20, 27 carrying upwardly facing bar codes 23, 28 are entered into the machine 1 through inlet 3, and relative to the bar code reader, in a substantially juxtaposed and a side-by-side position. This is, however, by way of example only and the coupons and bar codes could, for example, be entered into the machine and through the bar code reader longitudinally or end-on-end. For example, rather than providing a slide insert plate 4 as described with reference to FIG. 1 of the drawings, appropriate feed rollers (not shown) could be provided to assist in feeding the coupons (be they located side-by-side or end-on-end) through the inlet 3 and relative to the bar code reader (and/or security reader).

While the invention has been described by way of example only with reference to a predetermined number or amount of coins or cash being dispensed, such as on coupons being accepted and verified, it should be appreciated that this is by way of example. If desired, the dispensing means could for example dispense lottery tickets, monetary notes, vouchers, novelty gifts, or other matter. Thus, it should be appreciated that the invention is not limited to the dispensing of coins.

It is envisaged that rather than burdening retailers with the requirement to pay out money to purchasers and to then obtain refunds from suppliers or manufacturers, the present method and/or machine can be employed in various outlets or locations, without involving retainers in time and expense, as has been the problem up until this time. The party organizing the coupon redemption scheme can be responsible for maintaining the machines and maintaining the level of coins supplied. Further, the machines can be provided with appropriate modems and associated electronics. The programmed processor in one form of the invention being programmed in such a way that information relating to the number of coupons being redeemed, can be fed back into the auxiliary program which can be removed and translated by authorised personnel. In addition, or alternatively, appropriate modems can be provided and telephone lines and the like can be linked to the machines so that a regular update can be obtained as to the level of redemption and the amount of coin remaining. This is, however, by way of example only.

It has been found that by requiring that at least two coupons be inserted into the machine (and be accepted by the reader prior to actuation of the coin release mechanism), the present invention provides a straightforward and efficient way of validating and redeeming coupons, which overcomes and substantially eliminates the time consumption and cost involved up until this time. The use of two juxtaposed coupons, each having an appropriate bar code, provides an additional security block to fraudulent use of the machine, such as by copying or photocopying a plurality of bar code coupons, and where in some forms of the invention the additional security means are provided, such as magnetic ink or strips, additional security against fraudulent and unauthorised use is possible.

It should be appreciated that the present invention has been described by way of example only and that improvements and modifications may be made to the invention without departing from the scope or spirit thereof as defined by the appended claims.

I claim:

1. A method of coupon verification, wherein at least two juxtaposed coupons each having a bar code printed or formed thereon, are passed substantially simultaneously through or relative to bar code reader means, such that said juxtaposed coupons if accepted by said bar code reader means cause matter to be dispensed from a holding and dispensing means.

2. A method as claimed in claim 1, wherein at least one of said coupons includes security means, and wherein said juxtaposed coupons are passed, substantially simultaneously, through or relative to said bar code reader means and security sensor means.

3. A method as claimed in claim 1, wherein acceptance of said coupons causes one or more coins to be dispensed from said holding and dispensing means.

4. A method as claimed in claim 1, wherein said coupons are positioned substantially side-by-side.

5. A method as claimed in claim 1, wherein said coupons are positioned substantially end-on-end.

6. A method as claimed in claim 1, wherein one face of a first coupon has a bar code printed or formed thereon together with an adjacent area or spacing; a second coupon having a bar code printed or provided thereon being positioned adjacent, on or within said area or spacing, so that said bar codes are juxtaposed relative to each other in a side-by-side or end-on-end orientation.

7. A machine for verifying and validating coupons, wherein said coupons each carry bar code markings; comprising a housing having an inlet for said coupons, bar code reader means being provided at or adjacent said inlet and within said housing; holding and dispensing means and a programmed processor being provided within said housing; the arrangement being such that on at least two coupons being passed substantially simultaneously into and through said bar code reader means, and being accepted thereby, a predetermined or desired amount of matter will be dispensed from said holding and dispensing means.

8. A machine as claimed in claim 7, further including security sensor means at or adjacent said inlet, wherein at least one coupon carries or incorporates security means, the arrangement being such that said at least one coupon must pass relative to and be accepted by said security means before said dispensing and holding means dispenses matter.

9. A machine as claimed in claim 7, wherein said housing includes a screen, the arrangement being such that on said coupons being accepted, said programmed processor will cause product information relative to at least one said coupons to appear on said screen at substantially the same time as matter is dispensed from said holding and dispensing means.

10. A machine as claimed in claim 7, wherein said housing includes a screen, the arrangement being such that on said coupons being rejected, said programmed processor will cause information or directions relative to said rejection to appear on said screen.

11. A machine as claimed in claim 7, wherein an ancillary program is provided in association with said programmed processor to provide updated and refund information for a predetermined period of time.

12. A machine as claimed in claim 7, wherein said holding and dispensing means hold and dispenses coins.

13. A coupon for use with a machine as claimed in claim 7, wherein advertising matter or indicia appears on a first face of said coupon; at least a second face of said coupon being provided with a bar code marking; a spacing or area being provided adjacent said bar code marking, such as to allow a further coupon with a bar code marking thereon to be placed over or in juxtaposition with said spacing or area, such that said bar code markings are positioned in juxtaposition one with the other, so as to allow said juxtaposed coupons to pass substantially simultaneously through or relative to said bar code reader means.

* * * * *